United States Patent [19]

Sochor

[11] 4,360,781
[45] Nov. 23, 1982

[54] CIRCUIT FOR PRODUCING TIMING PULSES IN THE REGENERATION OF SQUARE SIGNALS

[75] Inventor: Josef Sochor, Darmstadt, Fed. Rep. of Germany

[73] Assignee: Robert Bosch GmbH, Stuttgart, Fed. Rep. of Germany

[21] Appl. No.: 216,863

[22] Filed: Dec. 16, 1980

[30] Foreign Application Priority Data

Dec. 19, 1979 [DE] Fed. Rep. of Germany ....... 2951022

[51] Int. Cl.³ .......................... H03K 13/32; H03L 7/00
[52] U.S. Cl. ........................................ 328/120; 328/63; 328/73; 307/269; 307/518
[58] Field of Search ..................... 328/120, 63, 74, 73, 328/72; 307/518, 269

[56] References Cited

U.S. PATENT DOCUMENTS 2,984,789 5/1961 O'Brien ............................... 328/120
3,080,487 3/1963 Melloti et al. .................. 328/120 X

OTHER PUBLICATIONS

"A High Speed Regenerator for Digital Signals", by L. J. Harrison (Marconi Review 1974) (2nd Quarter, pp. 93-105).

Primary Examiner—John S. Heyman
Attorney, Agent, or Firm—Frishauf, Holtz, Goodman & Woodward

[57] ABSTRACT

To obtain timing signals which continue essentially in phase even in the case of signal drop-out, a timing signal is supplied to a phase comparator which is also connected to a variable oscillator. Low-frequency output of the comparator is supplied to circuitry which, in the case of signal drop-out, initially retains a most recently encountered frequency and which then gradually shifts to a frequency which is the average of recent frequencies.

1 Claim, 1 Drawing Figure

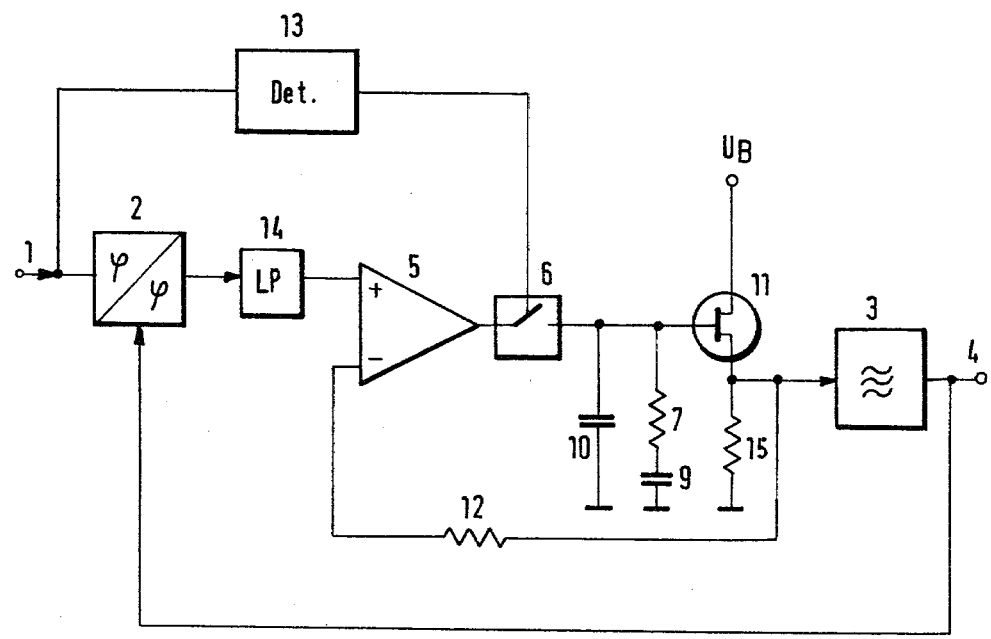

CIRCUIT FOR PRODUCING TIMING PULSES IN THE REGENERATION OF SQUARE SIGNALS

Filed of even date and assigned to the assignee of the present application is a patent application entitled "Circuit for Obtaining a Timing Signal" by the inventor of the subject matter of the present application.

The present invention relates to circuitry for producing a timing signal and, more particularly, for producing timing pulses from recorded digital signals.

BACKGROUND AND PRIOR ART

For the reproduction of pulses representing digital signals, preferably as recorded on magnetic tape, it is necessary to derive a timing signal for the purpose of signal regeneration. Such timing signal desirably continues even in the case of signal drop-outs. It is known to produce such timing signals by means of "flywheel" circuits. However, such circuits have the drawback that, in the absence of synchronizing pulses, the variable oscillator may oscillate at an arbitrary frequency which does not correspond to the desired frequency. Indeed, especially in the case of magnetic recordings, the desired frequency may vary from instant to instant depending on the speed of the tape.

THE INVENTION

It is an object of the invention to provide a circuit which produces an essentially synchronized timing signal even under conditions of signal drop-out. In the case of a drop-out, a circuit in accordance with the invention maintains the most recently present frequency, yet it is capable of relatively rapid adjustment to frequency changes.

A circuit in accordance with the invention includes timing signal input means, a phase comparator, a low pass filter which is connected to the phase comparator, and a variable oscillator whose output is supplied to the comparator. Between the low pass filter and the variable oscillator a differential amplifier is connected to an impedance converter via an electronic switch which disconnects amplifier current in the case of a signal drop-out, replacing amplifier current with a current due to discharge of a capacitor which is in series with a resistor, the series being parallel to another capacitor. The impedance converter is also connected, via a second resistor, to the second input of the differential amplifier.

THE DRAWING

An embodiment of the invention is shown in the drawing in a single FIGURE, as an example, and described below in detail, The circuit shown in the drawing is supplied with pulses at input terminal 1; these pulses are derived from pulses obtained from a recording medium as shown, e.g., in the above-identified copending patent application which is hereby incorporated by reference. These pulses are supplied to an input terminal of a phase comparator circuit 2 whose other input terminal is supplied with the output voltage of a variable oscillator 3. The desired timing signal is available at the output terminal 4 of the variable oscillator 3. As is usual, a low pass filter 14 is connected between the phase comparator circuit 2 and the control input terminal of the oscillator 3. Between this low pass filter 14 and the control input terminal of oscillator 3, a circuit is connected as follows. The output voltage of the low pass filter 14 is supplied to the noninverting input terminal of a differential amplifier 5 whose current output terminal is connected to an electronic switch 6. A modulator component having suitable characteristics for switch 6 and having a current output terminal is commercially available under the designation OTA. The switch 6 is so controlled by a signal which arises during drop-outs that, during a drop-out, the switch 6 is in the nonconducting state. The detector circuit 13 for obtaining such a signal is well known from the literature; see, e.g., U.S. Pat. No. 3,328,521, corresponding to German disclosure DE-OS 1437209. The output terminal of the switch 6 is connected to a fixed potential via the capacitor 10 and also via the register 7 and the capacitor 9 in series; the capacitance of capacitor 9 is large as compared with the capacitance of capacitor 10. The voltage at capacitor 10 is supplied to the control input terminal of the variable oscillator 3 via an impedance converter which consists of the resistor 15 and the field effect transistor 11; this voltage is also supplied via a resistor 12 to the inverting input terminal of the differential amplifier 5.

In the absence of signal drop-outs, the switch 6 remains in the closed position as shown in the drawing, and the output voltage of the impedance converter 11 follows the output voltage of the low pass filter at a rate which is limited by the capacitor 10. The capacitance of the capacitor 10 is chosen so a to permit this output voltage to follow the frequency of the input pulses at a sufficiently rapid rate. In the process, the capacitor 9 is charged via resistor 7 to an average value of the voltage at the capacitor 10. The resistance of the resistor 7 is chosen such that only a small current flows in the series of capacitor the 9 and the resistor 7 as compared with the current through the capacitor 10, i.e., such that operation is unaffected in the absence of a signal drop-out.

In the case of a drop-out, the switch 6 opens, and the output current of a differential amplifier 5 is replaced by a current which is due to the charge on the capacitor 9. As a result, the variable oscillator 3 at first maintains its frequency and, if this frequency differs from the average of recent frequencies, the oscillator frequency gradually reverts to such average frequency. The capacitance of capacitor 9 is chosen such that no substantial discharge occurs for the duration of an estimated signal outage so that, upon reappearance of the signal, the oscillator has a frequency which depends on the length of the outage and which lies between the frequency last present before the outage and the average frequency.

Example. For an expected pulse frequency of timing pulses per second, the following circuit components are appropriately chosen: A capacitor 10 of 2nF, a capacitor 9 of 220nF, a resistor 7 of 1kΩ, and a resistor 12 of 2kΩ.

I claim:

1. Electrical circuit for producing a continuting timing signal, said circuit comprising timing signal input means (1), a phase comparator (2), a low pass filter (14), a variable oscillator (3), a differential amplifier (5) which is capable of operating as a current source, switching means (6) response to signal amplifier (5) upon signal drop-out, a first capacitor (10), a series of a second capacitor (9) and a first resistor (7), an impedance converter (11, 15), and a second resistor (12), a first input of said phase comparator (2) being connected to said input means (1), a second input of said phase comparator being connected to the output (4)

of said variable oscillator (3), the output of said phase comparator being connected to the input of said low pass filter (14), the output of said low pass filter (14) being connected to a first input of said differential amplifier (5), said switching means (6) being interposed between the output of said differential amplifier (5) and said impedance converter (11, 15), said first capacitance (10) and said series (7, 9) being connected across the input of said impedance converter, the output of said impedance converter (11, 15) being connected to the control input of said variable oscillator (3) and also being connected by means of said second resistor (12) to the second input of said differential amplifier (5).

* * * * *